Feb. 27, 1962  E. M. VOORHEES  3,022,693
PASTRY CUTTER WITH PNEUMATIC STRIPPER
Filed April 17, 1957  3 Sheets-Sheet 1

Edward M. Voorhees
INVENTOR.

Feb. 27, 1962   E. M. VOORHEES   3,022,693
PASTRY CUTTER WITH PNEUMATIC STRIPPER
Filed April 17, 1957   3 Sheets-Sheet 2

Edward M. Voorhees
INVENTOR.

BY
Attorneys

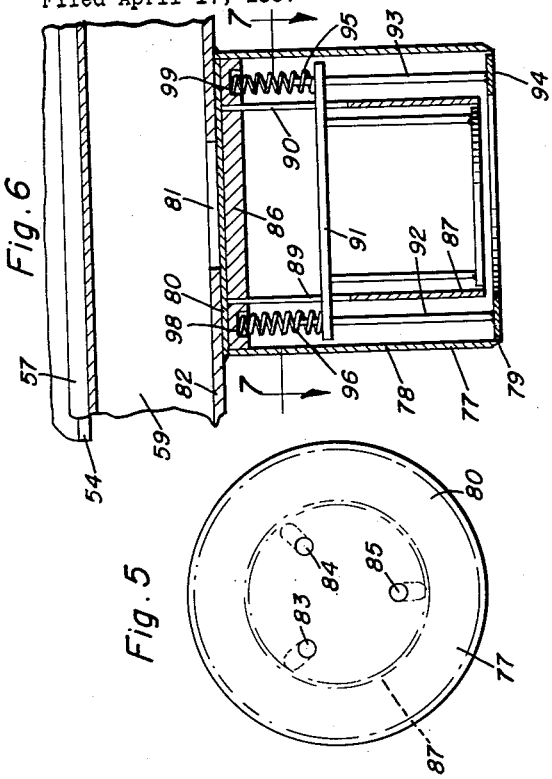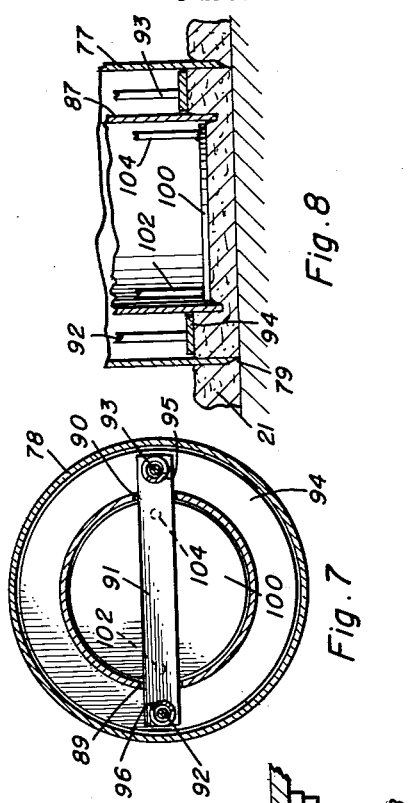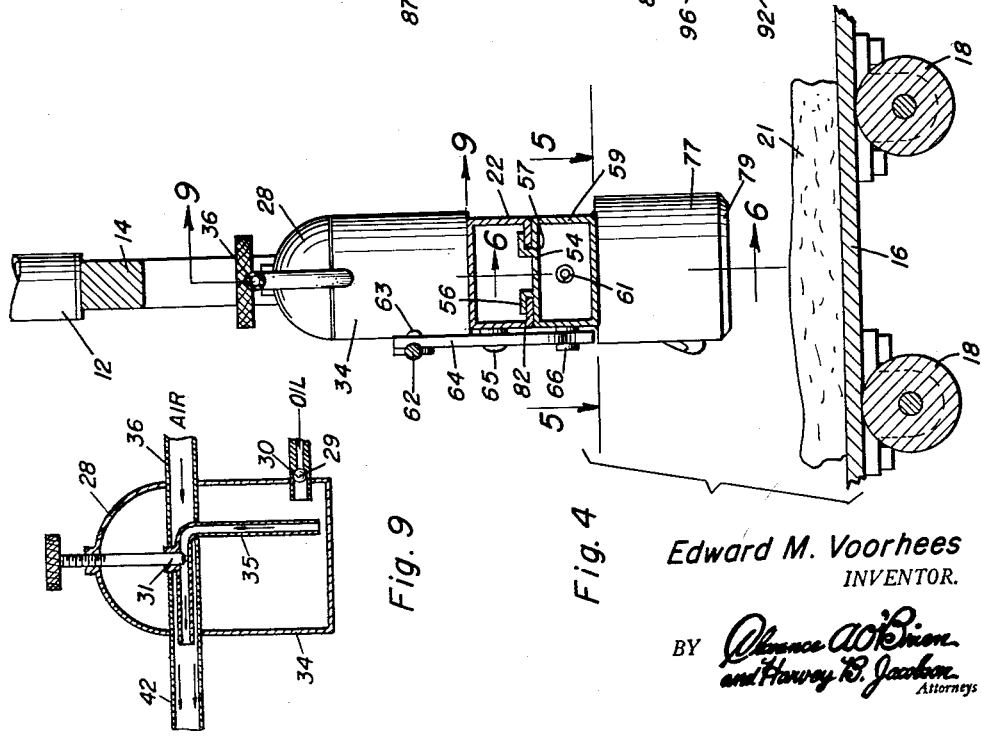

United States Patent Office 3,022,693
Patented Feb. 27, 1962

3,022,693
PASTRY CUTTER WITH PNEUMATIC STRIPPER
Edward M. Voorhees, 601 N. Adelle Ave., De Land, Fla., assignor, by mesne assignments, of one-fourth to Edward M. Voorhees, De Land, Fla., one-fourth to Ignatius C. Capdeville, Gretna, La., one-fourth to Clarence M. Funk, Greensboro, N.C., and one-fourth to Lawrence L. Mullins, New Orleans, La.
Filed Apr. 17, 1957, Ser. No. 653,419
4 Claims. (Cl. 83—169)

This invention relates to a pastry cutter and former and more particularly to a device for cutting and forming patty shells.

An object of the invention is to provide a device for cutting and forming patty shells in a continuous and rapid production line. This product, patty shells, is formed from sheets of prepared dough that are conveyed on a travelling belt beneath a vertically movable cutter which is known as a guillotine, upon which the device is attached. The device contains a battery of two or more cutters set at right angular relationship to the moving belt, and involves a mechanical feature that shifts the set of cutters in such manner that alternate thrusts make staggered cuts in order to avoid excess scrap dough.

The cutters which use the principle of an inner and outer cylinder are so arranged that the outer cylinder cuts completely through the dough and the inner cylinder penetrates only partially in the dough in order to form an indentation therein. For the purpose of producing an inner compartment in the baked patty shell by this method, it is necessary to apply a quantity of salad oil upon the entire perimeter of the indentation made by the inner cylinder. In the interest of rapid cutting, it is also necessary to prevent delay in release of the flat piece of cut dough so that stripping is positive after each thrust of the guillotine. According to my invention salad oil is applied by a sliding oil and air manifold enabling the production of patty shells quicker and more positively than has heretofore been known. Accordingly, it is a further object of the invention to produce a patty shell in a more rapid manner by means of a novel oil and air manifold arranged to function in the manner described above.

A further object of the invention is to provide a practical device which is capable of being applied in a bakery line of equipment to serve a particular job of producing patty shells much more rapidly and more positively and effectively.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a transverse sectional view taken on the line 4—4 of FIGURE 1;

FIGURE 5 is a transverse sectional view taken on the line 5—5 of FIGURE 4;

FIGURE 6 is a vertical sectional view taken on the line 6—6 of FIGURE 4 and showing principally the cutter and stripper;

FIGURE 7 is a transverse sectional view of the cutter and stripper, taken on the line 7—7 of FIGURE 6;

FIGURE 8 is a fragmentary sectional view of the cutter and stripper, showing the same in use;

FIGURE 9 is a sectional view taken on the line 9—9 of FIGURE 4.

Figure 1:
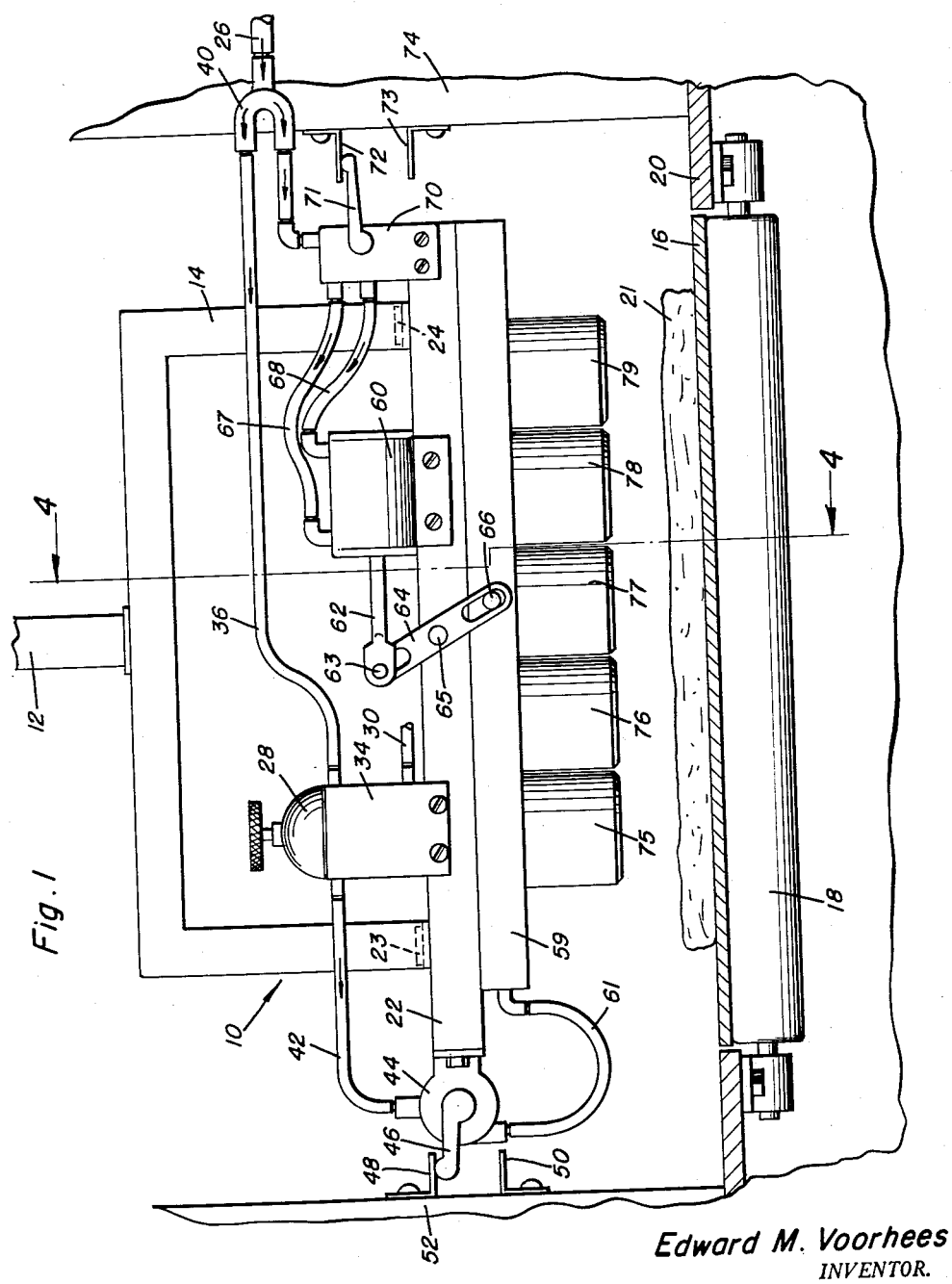
FIGURE 1 is an elevational view of a device constructed in accordance with the invention, showing the same being operatively connected with a moving belt conveyor with dough thereon.
Figure 2:
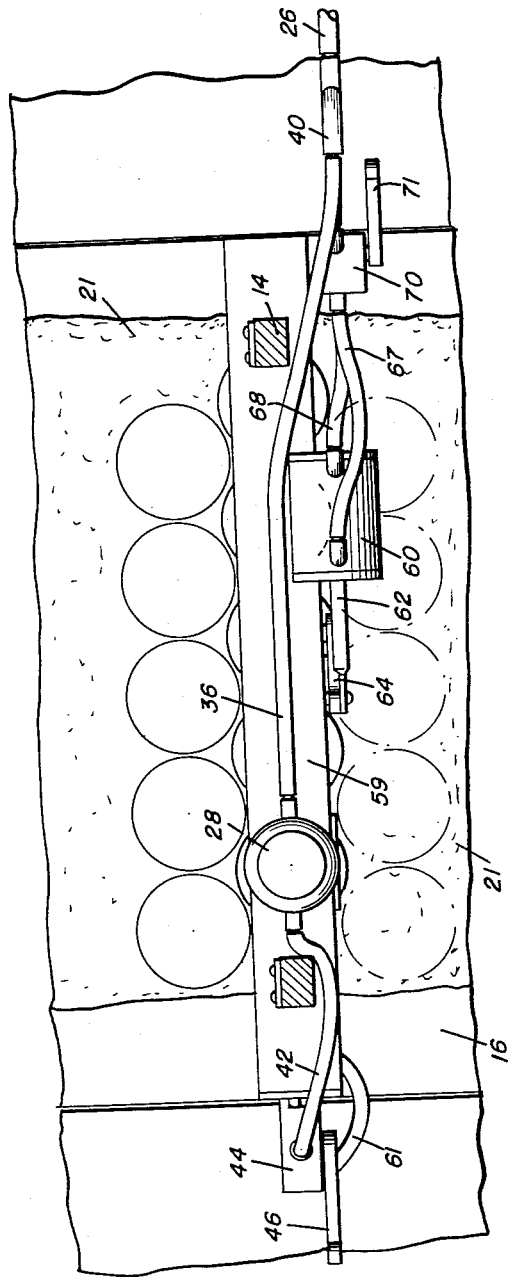
FIGURE 2 is a horizontal sectional view looking downwardly upon the structure in FIGURE 1.

In the accompanying drawings there is illustrated a bakery device 10 which is constructed in accordance with the invention. This device is attached to the push rod 12 by yoke 14, the push rod and yoke being conventional structure and adapted to reciprocate by structure which is not shown. This is a guillotine movement which is well-known in the bakery trade. The same holds true of the conveyor belt 16 operable on rollers 18 that are carried by supporting structure 20. Dough 21 in sheet form is propelled by the conveyor 16 beneath the guillotine.

My device is composed of a mounting bar 22 which is connected to yoke 14 by studs 23 and 24 so that as the yoke 14 is moved in vertical strokes, the mounting bar 22 is similarly reciprocated. Air line 26 is connected to a tank of compressed air (not shown) and salad oil is supplied to regulator valve 28 through conductor 30 containing check valve 29, and which is attached to a reserve salad oil tank.

Regulator 28 (FIGURE 9) is composed of a chamber 34 mounted on the bar 22 and has a tube 35 therein provided with a valve 31 which regulates the quantity of oil flowing from chamber 34 through tube 35, that is admixed with air that passes through the part of air line 36 in chamber 34. The air line is secured to Y 40 in order to pass air under pressure through a part of the chamber 34. Since portions of line 36 and tube 35 are concentrically spaced there is a venturi action to draw the oil from chamber 34. The regulator construction is conventional. The result is that there is a mixture of air and oil which is discharged from oil regulator 28 and which passes through line 42 to the standard two-way valve 44. This valve is carried by bar 22 and has a valve operating arm 46 connected therewith. Stops 48 and 50 are attached to a support 52 at the side of yoke 14 and are adapted to be contacted by the valve arm 46 in order to open and close the air-oil valve 44 in response to reciprocation of the mounting bar 22.

Figure 3:
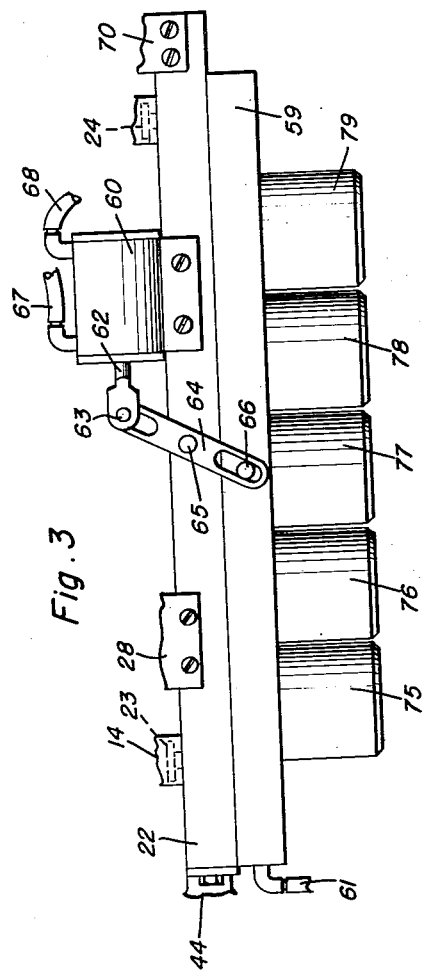
FIGURE 3 is a fragmentary elevational view of the air and oil manifold and means to operate it.

There is a longitudinal slot 54 in the bottom of the mounting bar, the latter being hollow. The slot functions as a guide with traveling shoes 56 and 57 passed therethrough and resting on the upper surface of the bottom of travelling bar 22. Shoes 56 and 57 are attached to the top of elongated oil and air manifold 59, such as by welding. The manifold 59 is rectangular in cross section and hollow, having flexible conductor or line 61 connected at one end thereof and connected to the discharge end of the air-oil valve 44. Accordingly, air and oil under pressure are applied to the manifold 59 in response to opening and closing of valve 44. There are means for shifting the air manifold to two different positions (compare FIGURES 3 and 1). These means consist of an air motor 60, comprising a cylinder having a piston with a piston rod 62 protruding therefrom. The cylinder is attached to the mounting bar 22 and the piston rod is approximately parallel to the bar. Lever 64 is pivoted by pin 65 to the mounting bar 22 and by pin and slot connection 63 at its upper end, derives motion from the piston rod 62. Pin and slot assembly 66 connects the lower end of lever 64 with the air and oil manifold 59. Air lines 67 and 68 are operatively connected to opposite ends of the air cylinder and to the conventional two-way air valve 70 which is mounted on bar 22 and functions to reverse the air-flow direction (see arrows in FIGURE 1) so that the piston in cylinder 60 reverses direction, in turn shifting the manifold 59 from side to side. Valve operating arm 71 protrudes from the valve 70 and is adapted to contact the two stops 72 and 73 that are carried by support 74 alongside of the device. Therefore, as the device is reciprocated by yoke 14, the two-way valve 70 is opened and closed respectively thereby causing the lever 64 to be oscillated back and forth and thereby sliding the oil and air manifold 59 to left and right positions on mounting bar 22. This motion enables the dough 21 to be cut in staggered rows thereby minimizing waste.

There are five cutters 75, 76, 77, 78 and 79 carried by the air and oil manifold and each is constructed identically. Moreover, any number of such cutters may be used depending upon the size of operation and the desires of the owner. Cutter 77 is shown in detail (FIGURES 5–8) and all other cutters are identical. Cutter 77 comprises an outer cylinder 78′ having a sharpened lower edge 79 and a top wall 80 which is attached to the lower surface of air and oil manifold 59. Aperture 81 in the lower wall 82 of manifold 59 is in registry with the three passages 83, 84 and 85 which pass through the top wall 80 and through the plate 86 which backs the top wall 80. Inner cylindrical cutter 87 is attached to the plate 86 and is shorter than the outer cutter 78 inasmuch as it is not to penetrate the dough 21 completely (FIGURE 8) but is only to make an impression therein. Slots 89 and 90 are formed in the inner cutter 87 near the top thereof and have bar 91 vertically reciprocably disposed therein and passed therethrough. Guides 92 and 93 are secured to the annular stripper 94 between cutters 78′ and 87 and passed through holes in the part 91. Springs 95 and 96 are concentrically arranged with guides 93 and 92 and seat in wells 98 and 99 formed in the plate 86 and seat on the bar 91. Therefore, they constantly bias stripper 94 and the stripper 100 which is attached to the lower ends of supports 102 and 104 carried by bar 91. The stripper 100 is reciprocable in the inner cutter 87.

The cutters 78 and 87 are arranged such that the outer cylinder cuts completely through the dough 21 and the inner cylinder penetrates only to a partial depth into the dough, to form an indentation therein. To prevent dough from sticking to the cutter, salad oil is applied upon the entire perimeter of the indentation made by the inner cutter 87, and this is accomplished by the air and oil manifold 59.

In operation the yoke 14 is reciprocated as the conveyor 16 propels the dough 21. However, during the reciprocation of yoke 14, the manifold 59 is shifted first to the left and then to the right in order to form a staggered pattern of cuts in the dough 21 and at the same time, the apertures 81 register with passages 83, 84 and 85 whereby charges of oil laden air are applied to the cutters, the air and oil manifold facilitating the effective stripping of the patty shells from the cutters.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a bakery device for forming patty shells, which has a reciprocating support and a conveyor for propelling dough therebelow, said support including a mounting bar, an air and oil manifold carried by said mounting bar, means for shifting said manifold periodically, hollow cutters carried by said manifold and in communication with the interior of said manifold for severing staggered rows of dough pieces from the dough advanced on said conveyor, and means for applying oil and air under pressure into said manifold and said cutters to facilitate stripping of the severed dough pieces from the cutters and deposit oil thereon.

2. In a bakery device for forming patty shells, which has a reciprocating support and a conveyor for propelling dough therebelow, said support including a mounting bar, an air and oil manifold carried by said mounting bar, means for shifting said manifold periodically, hollow cutters carried by said manifold and in communication with the interior of said manifold for severing staggered rows of dough pieces from the dough advanced on said conveyor, and means for applying oil and air under pressure into said manifold and said cutters to facilitate stripping of the severed dough pieces from the cutters and deposit oil thereon, said means for applying oil and air under pressure to said manifold including a source of air under pressure, a source of oil, means for admixing said oil and air, and a valve to control the admission of the mixed oil and air to said manifold.

3. In a bakery device for forming patty shells, which has a reciprocating support and a conveyor for propelling dough therebelow, said support including a mounting bar, an air and oil manifold carried by said mounting bar, means for shifting said manifold periodically, hollow cutters carried by said manifold and in communication with the interior of said manifold for severing staggered rows of dough pieces from the dough advanced on said conveyor, means for applying oil and air under pressure into said manifold and said cutters to facilitate stripping of the severed dough pieces from the cutters and deposit oil thereon, said means for applying oil and air under pressure to said manifold including a source of air under pressure, a source of oil, means for admixing said oil and air, and a valve to control the admission of the mixed oil and air to said manifold, said cutters having inner and outer cylindrical cutters with a stripper located between them, said manifold having apertures in registry with the interior of said inner cutters through which the oil and air is adapted to pass in order to lubricate the dough that is being stripped.

4. A machine for making patty shells, said machine comprising an air and oil manifold, means to supply air and oil under pressure therein, a plurality of cutters carried by said manifold, means intercommunicating said cutters with said manifold to introduce air and oil thereinto for lubricating dough severed by the cutters, said cutters having strippers which are also lubricated by the air and oil passing into said cutters, and means for laterally shifting said cutters to place said cutters at different relative positions with respect to the uncut dough.

References Cited in the file of this patent
UNITED STATES PATENTS

| | | |
|---|---|---|
| 447,113 | Hull | Feb. 24, 1891 |
| 475,280 | Jordan | May 17, 1892 |
| 485,863 | Fowler | Nov. 8, 1892 |
| 798,361 | Morton | Aug. 29, 1905 |
| 1,471,669 | Miller | Oct. 23, 1923 |
| 1,531,396 | Head | Mar. 31, 1925 |
| 2,446,201 | Turner | Aug. 3, 1948 |